(12) United States Patent
Wang et al.

(10) Patent No.: US 9,594,544 B2
(45) Date of Patent: Mar. 14, 2017

(54) VISUALIZED CODE REVIEW

(75) Inventors: Jingcun Wang, Shanghai (CN); Lin Tang, SuZhou (CN); Yingchun Xuan, Shanghai (CN); Robert L. Damata, Santee, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/491,554

(22) Filed: Jun. 7, 2012

(65) Prior Publication Data

US 2013/0332902 A1 Dec. 12, 2013

(51) Int. Cl.
*G06F 11/32* (2006.01)
*G06F 9/44* (2006.01)

(52) U.S. Cl.
CPC ........................... *G06F 8/38* (2013.01)

(58) Field of Classification Search
CPC ............... G06F 7/78; G06F 8/00–8/78; G06F 9/44–9/455; G06F 11/36
See application file for complete search history.

(56) References Cited

U.S. PATENT DOCUMENTS

| | | | |
|---|---|---|---|
| 7,386,831 B2 | 6/2008 | Flanagan | |
| 7,904,802 B1 | 3/2011 | Kolawa et al. | |
| 7,908,588 B2 | 3/2011 | Charboneau et al. | |
| 2004/0123186 A1* | 6/2004 | Kulp | G06F 8/38 714/38.1 |
| 2004/0202015 A1* | 10/2004 | Tai et al. | 365/154 |
| 2005/0144589 A1* | 6/2005 | Wainwright | G06F 9/45508 717/115 |
| 2005/0166094 A1* | 7/2005 | Blackwell et al. | 714/38 |
| 2005/0188257 A1* | 8/2005 | Morita | 714/13 |
| 2005/0188357 A1* | 8/2005 | Derks | G06F 11/3692 717/124 |
| 2006/0200803 A1* | 9/2006 | Neumann | G06F 8/71 717/120 |
| 2007/0234316 A1* | 10/2007 | Bayerlein | G06F 8/71 717/140 |
| 2008/0052684 A1 | 2/2008 | Bowdidge et al. | |
| 2008/0120543 A1* | 5/2008 | Cahill et al. | 715/700 |
| 2008/0148163 A1 | 6/2008 | Charboneau et al. | |
| 2008/0209328 A1* | 8/2008 | Parkinson | G06F 9/4443 715/733 |
| 2008/0295085 A1 | 11/2008 | Rachamadugu et al. | |
| 2008/0310736 A1 | 12/2008 | Chattopadhyay et al. | |

(Continued)

FOREIGN PATENT DOCUMENTS

CN 101206572 A 6/2008

OTHER PUBLICATIONS

Joorabchi et al., Detecting Inconsistencies in Multi-Platform Mobile Apps, 2015 pp. 450-460.*

(Continued)

*Primary Examiner* — H S Sough
*Assistant Examiner* — Zhan Chen
(74) *Attorney, Agent, or Firm* — Aneesh Mehta; Kate Drakos; Micky Minhas

(57) ABSTRACT

Visualization of the result of user interface code is provided in the context of code review. Changes to user interface code can be visualized to enable code reviewers to easily understand the effect of such changes. Furthermore, the visualization, or view, provides a surface for users to provide precise feedback to a developer.

20 Claims, 6 Drawing Sheets

(56) References Cited

U.S. PATENT DOCUMENTS

| | | | |
|---|---|---|---|
| 2009/0210860 A1* | 8/2009 | Sutherland | G06F 8/71 717/123 |
| 2009/0217309 A1* | 8/2009 | Grechanik | G06F 8/38 719/328 |
| 2010/0023930 A1 | 1/2010 | Beasley et al. | |
| 2011/0016453 A1* | 1/2011 | Grechanik et al. | 717/125 |
| 2011/0066893 A1* | 3/2011 | Bassin | G06F 8/20 714/38.1 |
| 2011/0090236 A1* | 4/2011 | Calsyn et al. | 345/581 |
| 2011/0161874 A1 | 6/2011 | Doughty et al. | |
| 2011/0214107 A1* | 9/2011 | Barmeir et al. | 717/125 |

OTHER PUBLICATIONS

"Integrated code reviews", Retrieved at <<http://www.plasticscm.com/features/code-review.aspx>> Retrieved Date: Apr. 16, 2012, p. 1.

"International Search Report & Written Opinion Received for PCT Patent Application No. PCT/US2013/042325", Mailed Date: Dec. 20, 2013, 13 Pages.

"First Office Action and Search Report Issued in Chinese Patent Application No. 201380029866.9", Mailed Date: Apr. 1, 2016, 16 Pages.

"Second Office Action Issued in Chinese Patent Application No. 201380029866.9", Mailed Date: Dec. 15, 2016, 11 pages.

\* cited by examiner

VISUALIZED CODE REVIEW

BACKGROUND

A software development process typically includes code review during or after an initial development phase and prior to testing. Code review (a.k.a., peer review) is a process of examining computer source code and providing feedback to a developer. The purpose is to provide a practice for identifying and correcting defects and vulnerabilities in software early in the development process when locating and addressing issues is relatively inexpensive compared to later stages of development (e.g., testing, profiling . . . ). Reviews involve line-by-line examination of code to check for flaws, compliance with design requirements, and adherence to coding standards, among other things. A number of tools exist to enable collaboration between code authors and reviewers as well as automate the review process. Generally, such tools compare versions of source code, identify textual differences in the code on a per line basis, and manage comments.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to visualized code review. A visualization can be presented of what user interface code creates during execution of source code including the user interface code. Changes to user interface code from a first version to a second version, for instance, can also be visualized to allow a code reviewer to recognize the result of such changes without difficulty. A code reviewer can also provide precise feedback to a code author on the visualization, or view. Stated differently, the view provides a surface to accept and relay comments from code reviewers to a developer.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Conventionally, a difference/comparison tool is available to aid code review. However, such a tool is onerous and ineffective for code reviewers to examine code lines, especially when trying to determine whether changes to a user interface (including automatically created code) are improvements to a user interface or making the user interface worse. Furthermore, if a code reviewer identifies a problem, it is difficult to provide precise feedback to a code author.

Details below are generally directed toward visualized code review. The result of user interface code is visualized to facilitate code review, as opposed to, or in combination with, conventional line-by-line examination of the code. Changes to user interface code, across versions for instance, can also be visualized to allow a code reviewer to recognize the result of such changes without difficulty. A code reviewer can also provide precise feedback to a code author on the visualization, or view. Furthermore, code can be automatically analyzed in view of known requirements (e.g., design, code standards . . . ), and a code reviewer can be notified of the results of the analysis by way of suggestions on the view or independent of the view. Although not limited thereto, at least a subset of the functionality disclosed herein can be injected into a difference/comparison tool resulting in an enhanced difference/comparison tool.

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
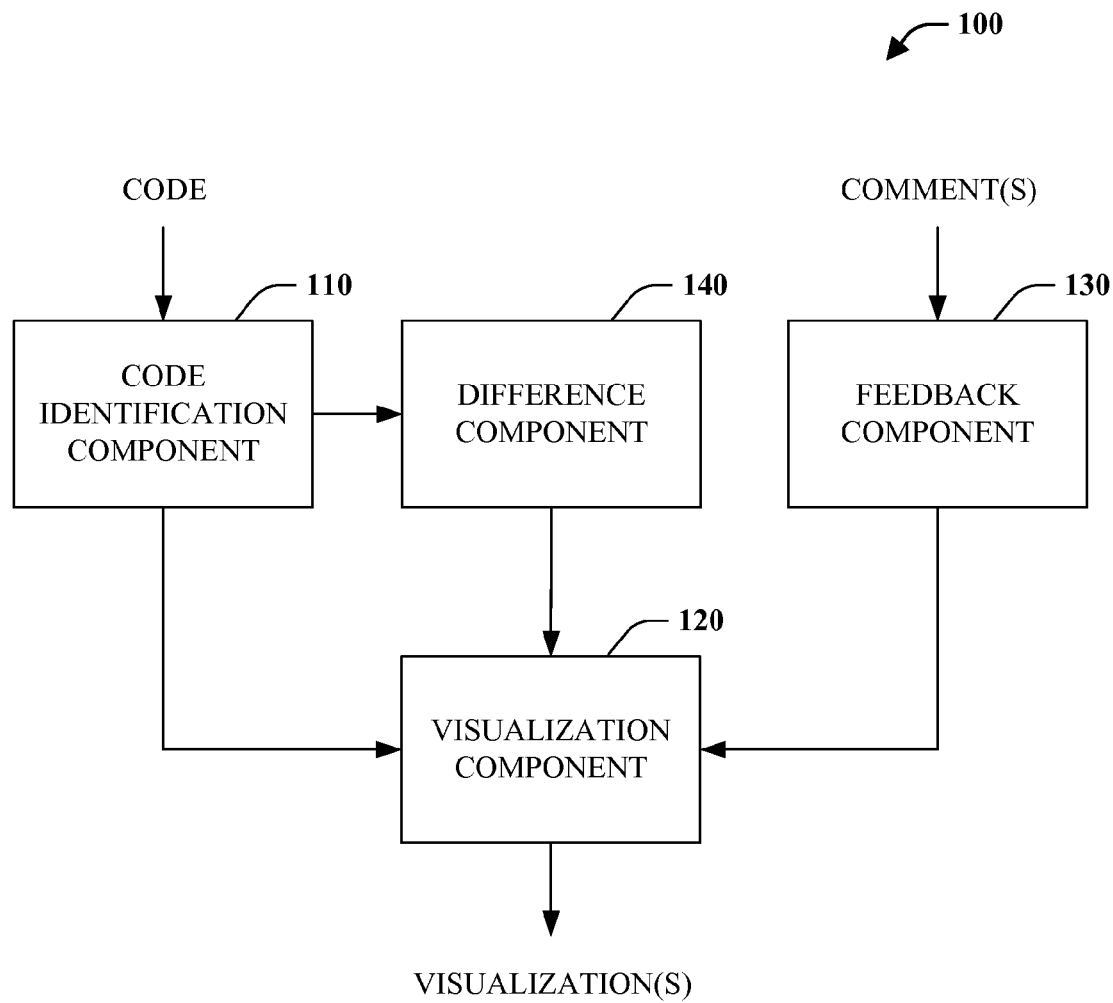
FIG. 1 is a block diagram of visualized code review system.

Referring initially to FIG. 1, a visualized code review system 100 is illustrated. The system 100 includes code identification component 110, visualization component 120, feedback component 130, and difference component 140. The code identification component 110 is configured to receive, retrieve, or otherwise obtain or acquire source code, or simply code, written in particular computer-programming language. Upon acquisition, the code identification component 110 is configured to identify user interface code, or in other words, code that, upon execution, produces various combinations of graphic elements (e.g., windows, menus, icons . . . ) and text to communicate with an end-user. The output of the code identification component 110, namely user interface code, is provided, or otherwise made available, to the visualization component 120.

The visualization component 120 is configured to visualize the result of the user interface code. More specifically, the visualization component 120 is configured to render a set of one or more visualizations, or views, that would be produced if the user interface code were executed in the context of program execution. Herein, rendering refers to generating content in a display format that can subsequently be presented on a physical display (e.g., LCD, touch screen . . . ) connected to a computer or other processor-based device. Code review often concerns differences is code or code state. Accordingly, the visualization component 120 can generate two views, one representing a first state and another representing a second state. In this manner, a code reviewer can visually compare and identify differences between the two views easily.

The feedback component 130 is configured to accept input, such as feedback from a code reviewer, and interact with the visualization component 120 to visualize the feedback with respect to a particular view. For instance, the feedback component 130 can initiate re-rendering of a view to include the feedback overlaid thereon. In accordance with one embodiment, the feedback component 130 can enable code reviewers to insert feedback directly on the visualization. Feedback can include textual comments, links, and/or graphics, among other things. By way of example, a code reviewer can identify and make a textual note of an issue with respect to user interface code on the view and include a hyperlink to a design document that identifies non-compliance with a particular requirement.

The difference component 140 is configured to compare and identify differences between versions of user-interface code. The difference component 140 can acquire the code versions from the code identification component 110 and identify differences. In one instance, the difference component 140 can employ techniques associated with conventional difference/comparison tools. Upon determining differences, the difference component 140 can interact with the visualization component 120 so that differences are noted graphically on a view. For example, the visualization component 120, in conjunction with the difference component 140, can produce a visualization, or view, that highlights, or signals in some way (e.g., color, underline, box . . . ), differences between versions of user interface code.

What follows is an example of a visualization that can be produced by the visualization component 120. The purpose of the visualization is to facilitate clarity and understanding with respect to aspects of this disclosure and not to limit the scope of the appended claims. Those of skill in the art will recognize upon reading this detailed description that visualizations can take many different forms and include a multitude of similar and dissimilar elements.

Figure 2:
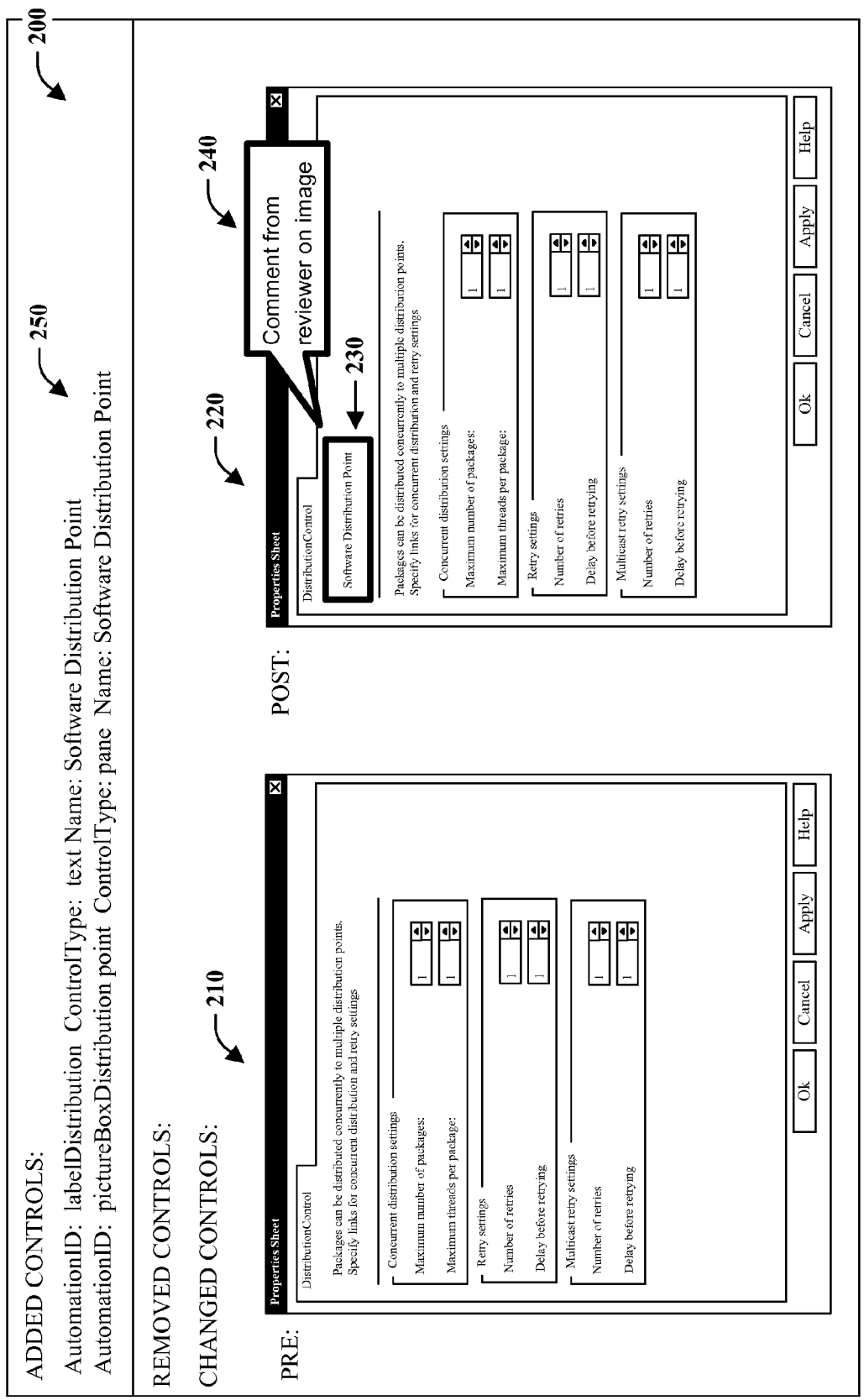
FIG. 2 illustrates an exemplary visualization.

FIG. 2 illustrates exemplary visualization 200. The exemplary visualization 200 illustrates one particular embodiment wherein functionality described herein forms part of an enhanced difference/comparison tool (a.k.a. diff tool). First user interface 210 corresponds to a first version of user-interface source code. Second user interface 220 corresponds to a second version, or state of user interface code. The first user interface 210 and the second user interface 220 are presented side by side to enable visual comparison. To assist a reviewer further, however, a difference between the two user interfaces is noted by box 230 on the second user interface 220. The difference in this example corresponds to an added control. Feedback 240 is also provided on the second user interface 220 in conjunction with the box 230 noting a difference. Here, the feedback is a simply textual comment. Note how the feedback 240 is overlaid on the second user interface 220. The visualization 200 also includes particular textual code associated with the user interfaces. Here, there are three categories, namely added controls, removed controls, and changed controls. Added controls include code 250 that describes the control added to a user interface noted visually in box 230. Although not illustrated, it is to be appreciated that the exemplary visualization 200 can be employed in conjunction with conventional difference/comparison functionality in which differences are shown at code level.

Returning to FIG. 1 briefly, in one instance the visualization component 120 can generate or render a static visualization such as or resembling a screenshot. However, the visualization component 120 is not limited to static visualizations or views. In accordance with one embodiment, the visualization component 120 can generate animations. This can be useful in identifying issues regarding transitions between user interfaces or elements of a single user interface, as examples. Further, audio associated with a user interface can accompany one or more visualizations. Still further yet, the visualization can be interactive at least to a degree to further facilitate code review by way of interaction with an interface.

Figure 3:
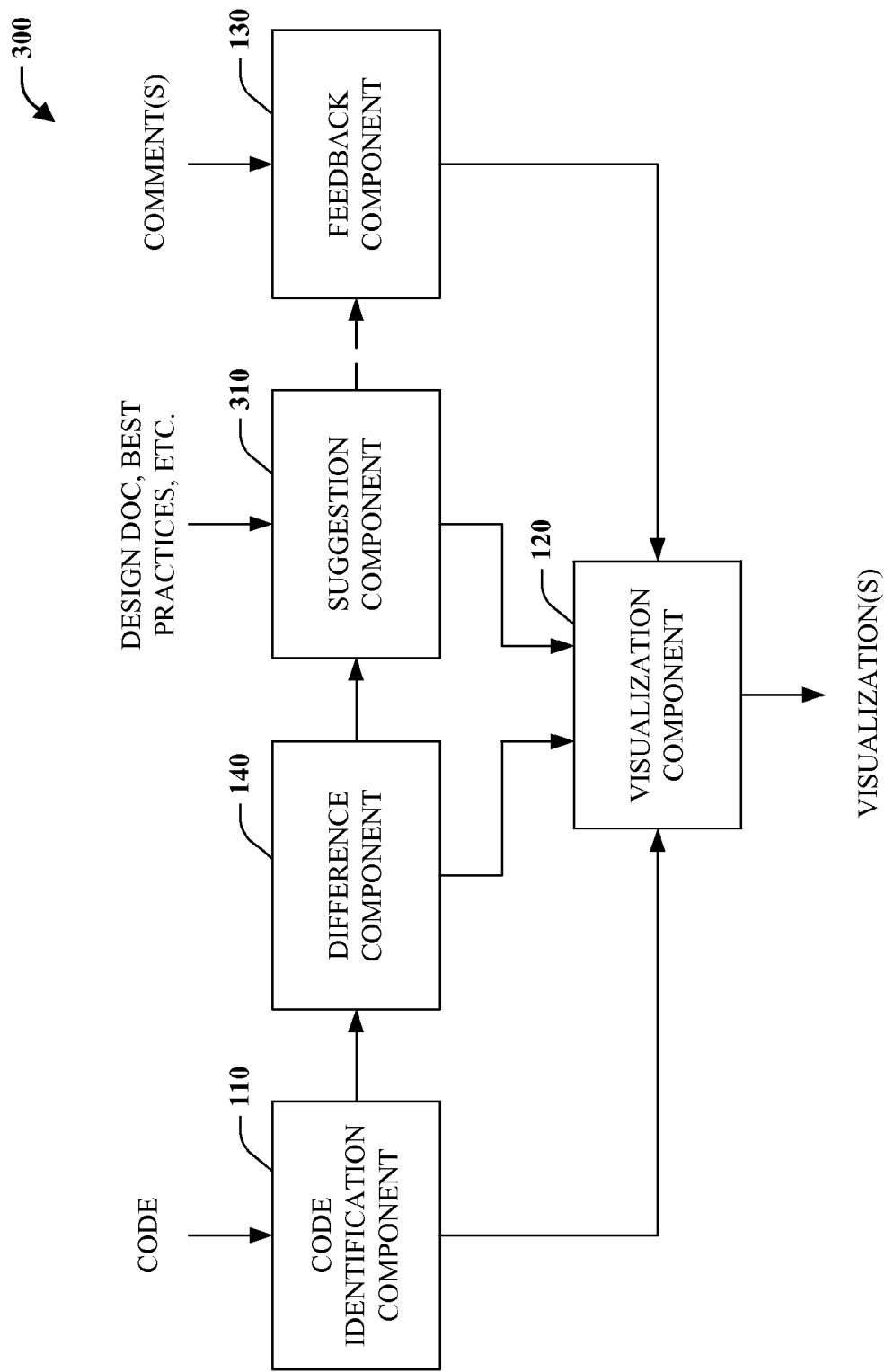
FIG. 3 is a block diagram of a visualized code review system including a suggestion component.

FIG. 3 illustrates a visualized code review system 300. System 300 includes all components of system 100 of FIG. 1, as described above, as well as suggestion component 310. In accordance with one embodiment, the code review process can be automated. The suggestion component 310 is configured to suggest issues to code reviewers. The suggestion component 310 can take as input a design document and/or information regarding code standards, among other things, and can output information regarding compliance/adherence. In one instance, the suggestion component 310 can operate over user-interface code and/or difference code that identifies differences between a current and previous version of code. The suggestion component 310 can automatically determine whether the user-interface code complies with requirements of a design document, for example. If any non-compliance is detected, the suggestion component 310 can notify a code reviewer. In one instance, a visualization produced by the visualization component 120 can be modified to note compliance issues. In other words, visual representations of issues can be presented. Alternatively, suggestion component 310 can notify a code reviewer independent of a visualization, or view. For example, that suggestion component 310 can interact with the feedback component 130. In this case, suggestions can be provided to a code reviewer to aid providing feedback. In one particular embodiment, suggestions can be capable of being accepted or rejected. Additionally, feedback can be automatically inserted into a visualization based on a suggestion. For example, if a particular suggestion is accepted a predetermined comment can be inserted in the visualization.

System 100 and system 300 can be implemented in a number of different ways. In one instance, the systems can be integrated within a difference/comparison tool such that one or more visualizations are produced in line with user-interface code, for example. In another instance, the systems can be available as a plug-in or extension to an existing difference/comparison tool. Still further yet, the systems can be implemented separate from a difference/comparison tool as a standalone tool or as part of some other code-review process management system.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or employ of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example, and not limitation, the suggestion component 310 can employ such functionality to infer compliance or non-compliance with particular requirements.

Figure 4:
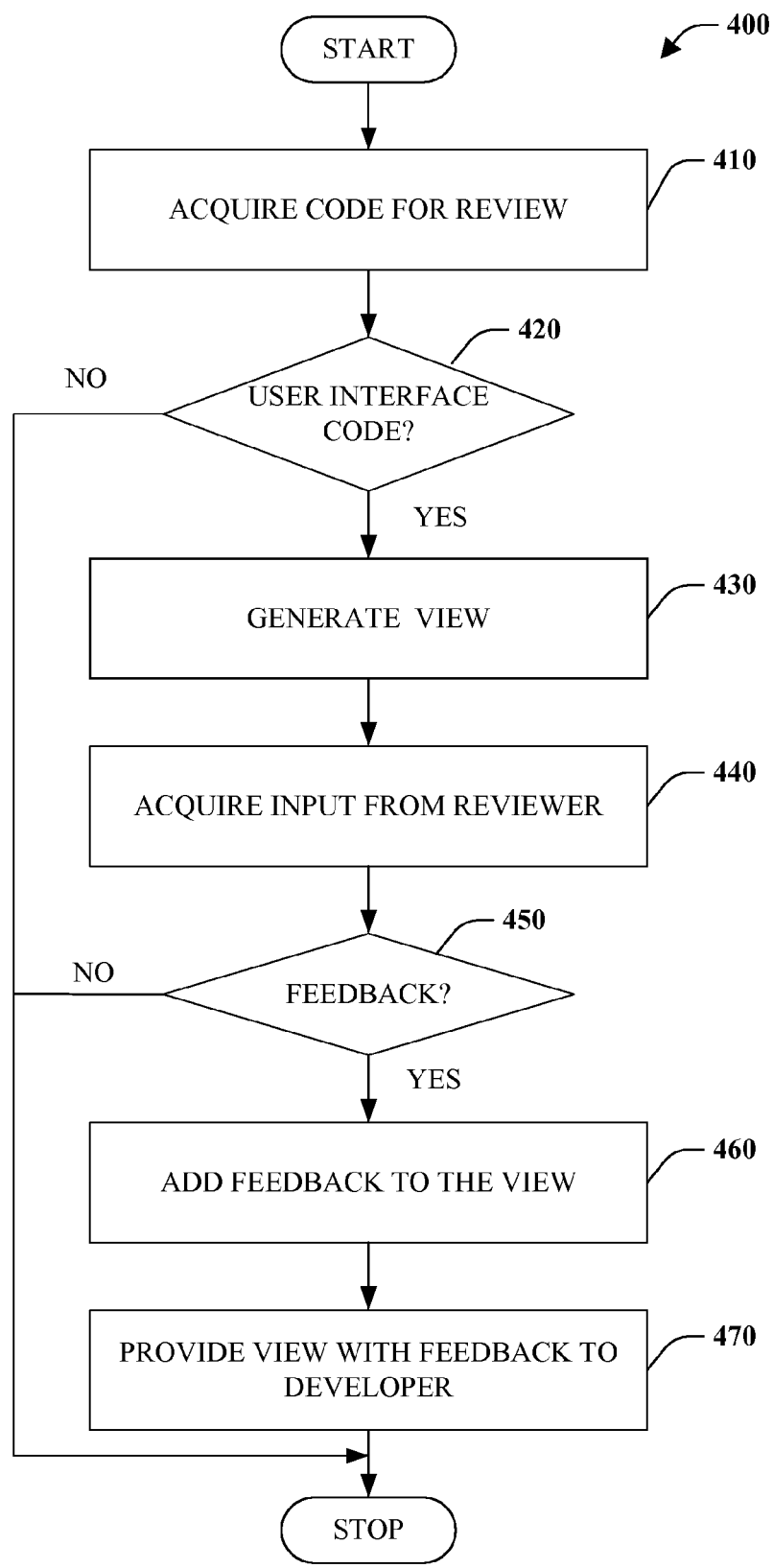
FIG. 4 is a flow chart diagram of a method of code review.
Figure 5:
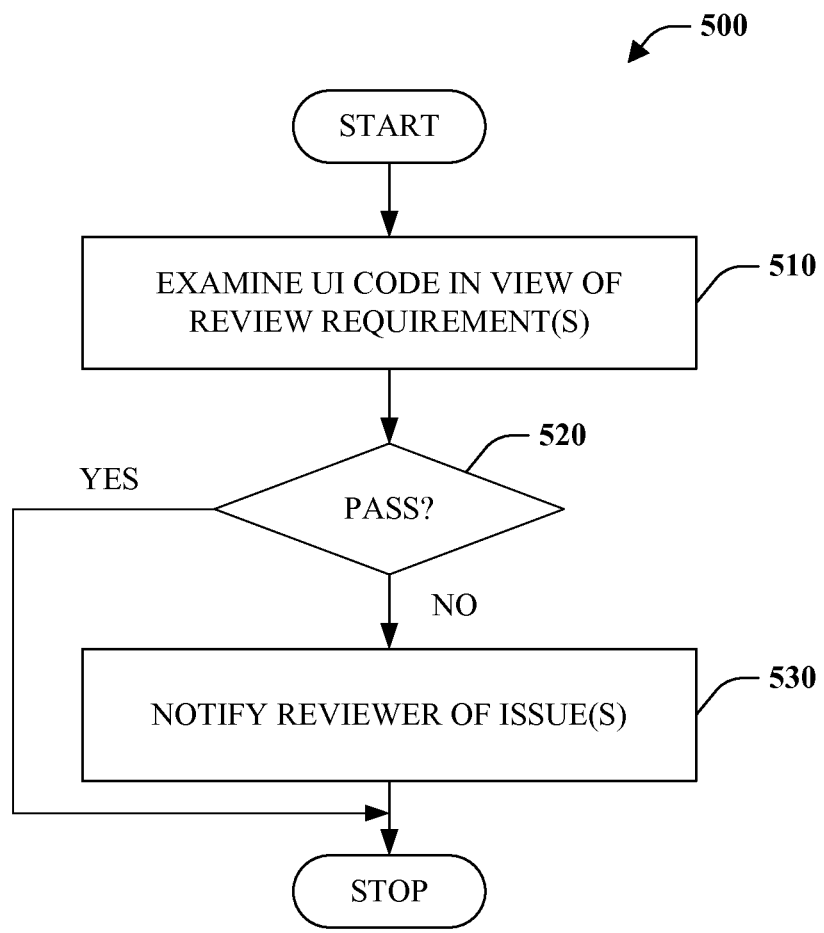
FIG. 5 is a flow chart diagram of automated code review.

In view of the exemplary systems described supra, methodologies that may be implemented in accordance with the disclosed subject matter will be better appreciated with reference to the flow charts of FIGS. 4 and 5. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Referring to FIG. 4, a method of code review 400 is illustrated. At reference numeral 410, source code is required for view. In one instance, the source code can be provided as part of a request for code review from a developer. A determination is made at numeral 420 as to whether any user-interface code exists in the source code. If there is no user-interface code ("NO"), the method terminates. In this case, convention code review can be employed. If there is user interface code ("YES"), the method continues at reference numeral 430 where a visualization, or view, is generated for the user interface code. At numeral 440, input can be acquired from a reviewer. At reference numeral 450, a determination is made as to whether the input is feedback. If the input is not feedback ("NO"), for instance, where the reviewer simply approves the code, the method terminates. Alternatively, if the input is feedback ("YES"), such as comment, the method continues at 460, where the feedback is added to the view of the user-interface code. The view including the feedback can be provided to a developer, such as the developer initiating code review, at 470 prior to the method terminating.

FIG. 5 is a flow chart diagram of a method of automated code review 500. At reference numeral 510, user interface code is examined automatically in view of review requirements such as but not limited to compliance with a design and a set of preferred coding practices. Such examination can include a number of tests embodying requirements and executed over the code, for example. A determination is made at 520 as to whether the user interface code passed, or in other words satisfied all the requirements. If the code passed ("YES"), the method can simply terminate. Alternatively, if the code did not pass ("NO"), the method can continue at numeral 530 where a code reviewer is notified of one or more issues in which the code failed to satisfy requirements. In accordance with one embodiment, the code reviewer can be notified of the issues by way of a visual indicator or signal on a view of user-interface code. In another embodiment, the notification can be external to the view but drive feedback thereon.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

As used herein, the terms "component," and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used this description and appended claims in is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A'employs 'Y,'" or "'A' employs both 'X' and 'Y,'" then "'A' employs 'X' or 'Y'" is satisfied under any of the foregoing instances.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 6:
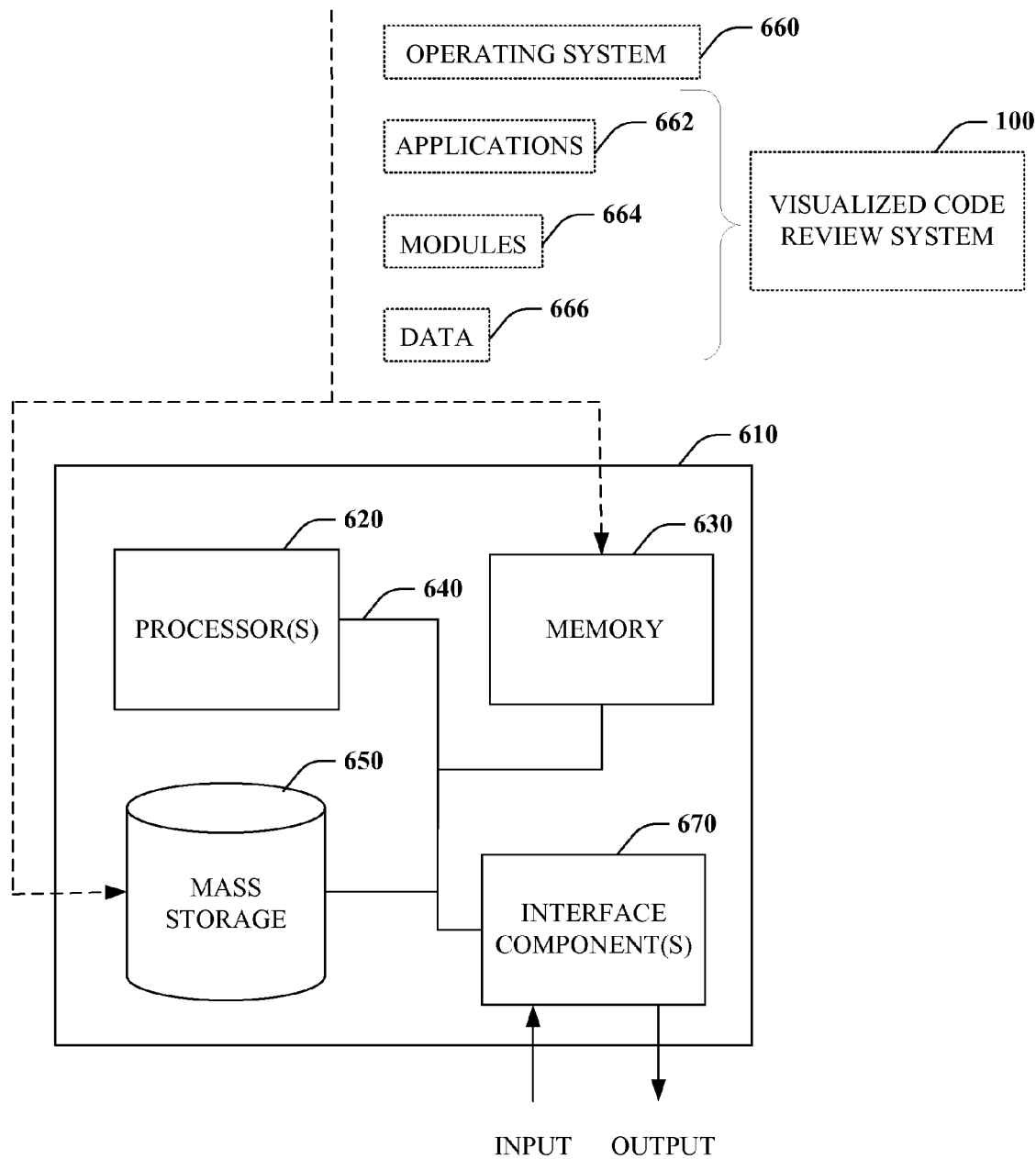
FIG. 6 is a schematic block diagram illustrating a suitable operating environment for aspects of the subject disclosure.

In order to provide a context for the claimed subject matter, FIG. 6 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, virtual machines in a virtualized environment, as well as personal computers, hand-held computing devices (e.g., personal digital assistant (PDA), tablet, phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 6, illustrated is an example general-purpose computer 610 or computing device (e.g., desktop, laptop, tablet, server, hand-held, programmable consumer or industrial electronics, set-top box, game system . . . ). The computer 610 includes one or more processor(s) 620, memory 630, system bus 640, mass storage 650, and one or more interface components 670. The system bus 640 communicatively couples at least the above system components. However, it is to be appreciated that in its simplest form the computer 610 can include one or more processors 620 coupled to memory 630 that execute various computer executable actions, instructions, and or components stored in memory 630.

The processor(s) 620 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 620 may also be implemented as a combination of computing devices, for example a combination of a DSP and a microprocessor, a plurality of microprocessors, multi-core processors, one or more microprocessors in conjunction with a DSP core, or any other such configuration.

The computer 610 can include or otherwise interact with a variety of computer-readable media to facilitate control of the computer 610 to implement one or more aspects of the claimed subject matter. The computer-readable media can be any available media that can be accessed by the computer 610 and includes volatile and nonvolatile media, and removable and non-removable media. By way of example, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like medium which can be used to store the desired information and which can be accessed by the computer 610. Further, computer storage media excludes signals.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 630 and mass storage 650 are examples of computer-readable storage media. Depending on the exact configuration and type of computing device, memory 630 may be volatile (e.g., RAM), non-volatile (e.g., ROM, flash memory . . . ) or some combination of the two. By way of example, the basic input/output system (BIOS), including basic routines to transfer information between elements within the computer 610, such as during start-up, can be stored in nonvolatile memory, while volatile memory can act as external cache memory to facilitate processing by the processor(s) 620, among other things.

Mass storage 650 includes removable/non-removable, volatile/non-volatile computer storage media for storage of large amounts of data relative to the memory 630. For example, mass storage 650 includes, but is not limited to, one or more devices such as a magnetic or optical disk drive, floppy disk drive, flash memory, solid-state drive, or memory stick.

Memory 630 and mass storage 650 can include, or have stored therein, operating system 660, one or more applications 662, one or more program modules 664, and data 666. The operating system 660 acts to control and allocate resources of the computer 610. Applications 662 include one or both of system and application software and can exploit management of resources by the operating system 660 through program modules 664 and data 666 stored in memory 630 and/or mass storage 650 to perform one or more actions. Accordingly, applications 662 can turn a general-purpose computer 610 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the visualized code-review system 100, or portions thereof, can be, or form part, of an application 662, and include one or more modules 664 and data 666 stored in memory and/or mass storage 650 whose functionality can be realized when executed by one or more processor(s) 620.

In accordance with one particular embodiment, the processor(s) 620 can correspond to a system on a chip (SOC) or like architecture including, or in other words integrating, both hardware and software on a single integrated circuit substrate. Here, the processor(s) 620 can include one or more processors as well as memory at least similar to processor(s) 620 and memory 630, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the visualized code-review system 100 and/or associated functionality can be embedded within hardware in a SOC architecture.

The computer 610 also includes one or more interface components 670 that are communicatively coupled to the system bus 640 and facilitate interaction with the computer 610. By way of example, the interface component 670 can be a port (e.g., serial, parallel, PCMCIA, USB, FireWire . . . ) or an interface card (e.g., sound, video . . . ) or the like. In one example implementation, the interface component 670 can be embodied as a user input/output interface to enable a user to enter commands and information into the computer 610 through one or more input devices (e.g., pointing device such as a mouse, trackball, stylus, touch pad, keyboard, microphone, touch screen, joystick, game pad, satellite dish, scanner, camera, other computer . . . ). In another example implementation, the interface component 670 can be embodied as an output peripheral interface to supply output to displays (e.g., CRT, LCD, plasma . . . ), speakers, printers, and/or other computers, among other things. Still further yet, the interface component 670 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method, implemented at a computer system that includes one or more processors, for visualizing source code review, the method comprising:
   acquiring a first version of a source code and a second version of the source code, each of the first version of the source code and the second version of the source code including a portion of source code associated with generating a user interface, the second version of the source code including particular source code that adds or changes at least one user interface control of the user interface as compared to the first version of the source code; and
   based at least on acquiring the first and second versions of the source code, generating a code review user interface, including concurrently presenting at least:
      a first visualization of the user interface that is based on the first version of the source code;
      a separate, second visualization of the user interface that is based on the second version of the source code, the second visualization including the at least one user interface control that was been added or changed in the second version of the source code, the at least one user interface control being presented with a visual highlight in the second visualization to indicate that it is a difference between the first visualization of the user interface and the second visualization of the user interface; and
      a code display portion that presents the particular source code that added or changed the at least one user interface control, and that indicates that the particular source code corresponds to the at least one user interface control that is presented with the visual highlight in the second visualization.

2. The method of claim 1, further comprising presenting an animation between the second visualization to the first visualization.

3. The method of claim 1, further comprising:
   receiving a comment from a code reviewer; and
   overlaying the comment on one of the first visualization or the second visualization.

4. The method of claim 3, wherein the comment is visually associated with the visual highlight.

5. The method of claim 1, further comprising inserting a suggestion accepted by a code reviewer as a comment on the second visualization.

6. The method of claim 1, further comprising removing a suggestion unaccepted by a code reviewer from the second visualization.

7. The method of claim 1, wherein one or more suggestions are automatically presented based on a determination of whether at least one of the first version of the source code and the second version of the source code comply with one or more source code standards.

8. A computer system, comprising:
   one or more processors; and
   at least one computer readable storage device having stored thereon computer-executable instructions that are executable by the one or more processors to cause the computer system to visualize code review, the computer-executable instructions including instructions that are executable to cause the computer system to perform at least the following:
      acquire a first version of a source code and a second version of the source code, each of the first version of the source code and the second version of the source code including a portion of source code associated with generating a user interface, the second version of the source code including particular source code that adds or changes at least one user interface control of the user interface as compared to the first version of the source code; and
      based at least on acquiring the first and second versions of the source code, generate a code review user interface, including concurrently presenting at least:
         a first visualization of the user interface that is based on the first version of the source code
         a separate, second visualization of the user interface that is based on the second version of the source code, the second visualization including the at least one user interface control that was been added or changed in the second version of the source code, the at least one user interface control being presented with a visual highlight in the second visualization to indicate that it is a difference between the first visualization of the user interface and the second visualization of the user interface; and
         a code display portion that presents the particular source code that added or changed the at least one user interface control, and that indicates that the particular source code corresponds to the at least one user interface control that is presented with the visual highlight in the second visualization.

9. The computer system of claim 8, wherein lines of the source code that correspond to the user interface are automatically detected.

10. The computer system of claim 8, wherein one or more differences between the first version of the source code and the second version of the source code are visually highlighted.

11. The computer system of claim 8, wherein a comment received from a code reviewer overlays the second visualization.

12. The computer system of claim 11, wherein a hyperlink to a design document that identifies non-compliance with a particular requirement overlays the second visualization.

13. The computer system of claim 11, wherein the comment is visually associated with the visual highlight.

14. The computer system of claim 8, wherein one or more suggestions are automatically presented based on a determination of whether at least one of the first version of the source code and the second version of the source code comply with one or more source code standards.

15. The computer system of claim 8, wherein the code review user interface presents an animation between the second visualization to the first visualization.

16. A computer program product comprising at least one hardware storage device having stored thereon computer-executable instructions that are executable by one or more processors of a computer system to cause the computer system to visualize code review, the computer-executable instructions including instructions that are executable to cause the computer system to perform at least the following:
acquire a first version of a source code and a second version of the source code, each of the first version of the source code and the second version of the source code including a portion of source code associated with generating a user interface, the second version of the source code including particular source code that adds or changes at least one user interface control of the user interface as compared to the first version of the source code; and
based at least on acquiring the first and second versions of the source code, generate a code review user interface, including concurrently presenting at least:
a first visualization of the user interface that is based on the first version of the source code
a second visualization of the user interface that is based on the second version of the source code, the second visualization including the at least one user interface control that was been added or changed in the second version of the source code, the at least one user interface control being presented with a visual highlight in the second visualization to indicate that it is a difference between the first visualization of the user interface and the second visualization of the user interface; and
a code display portion that presents the particular source code that added or changed the at least one user interface control, and that indicates that the particular source code corresponds to the at least one user interface control that is presented with the visual highlight in the second visualization.

17. The computer program product of claim 16, wherein a portion of the source code that corresponds to the user interface is automatically detected.

18. The computer program product of claim 16, wherein at least one comment regarding the user interface received from one or more code reviewers overlays the second visualization.

19. The computer program product of claim 18, wherein the comment is visually associated with the visual highlight.

20. The computer program product of claim 16, wherein the code review user interface presents an animation between the second visualization to the first visualization.

\* \* \* \* \*